July 31, 1962     A. W. SERIO     3,047,186
VENT KNOB
Filed Dec. 6, 1957     3 Sheets-Sheet 1
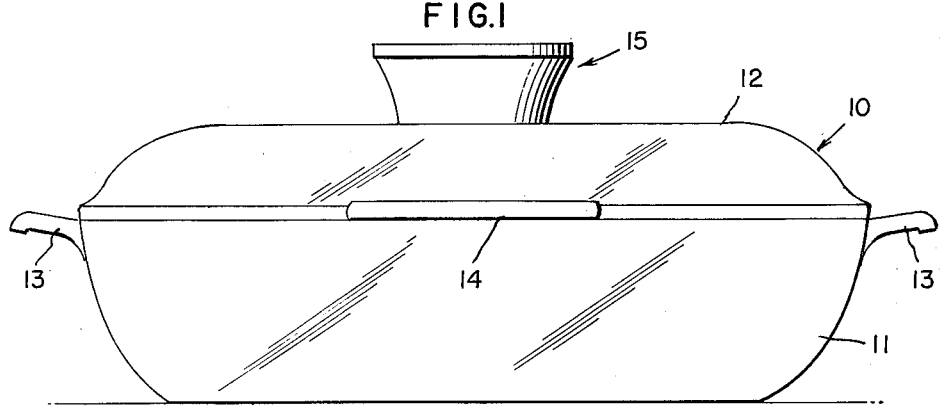
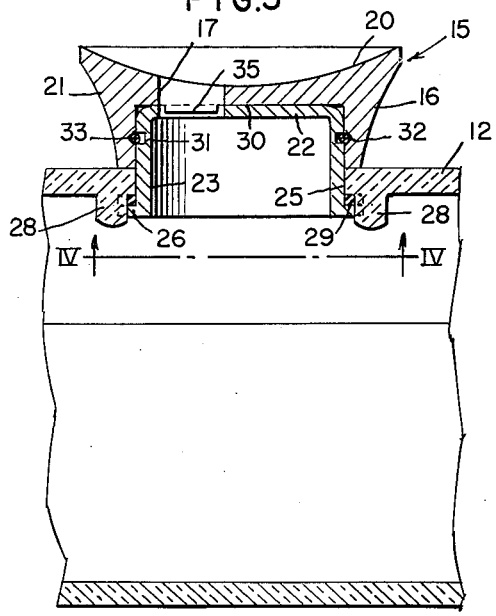
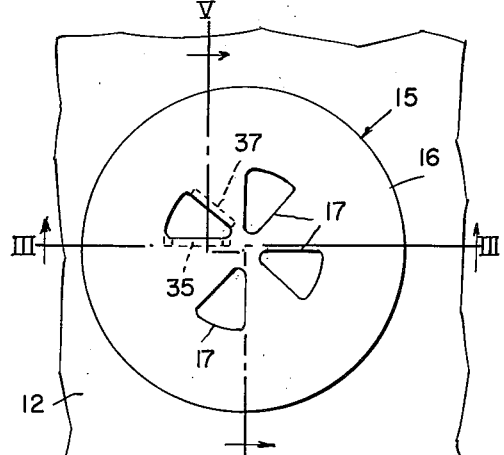
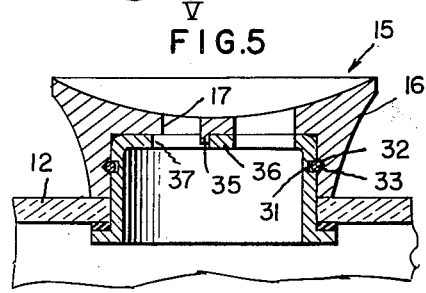
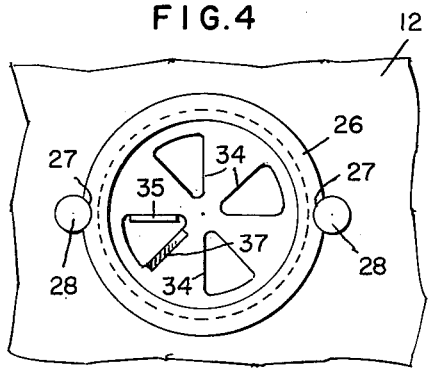
INVENTOR.
Anthony W. Serio
BY
Shoemaker & Mattare
ATTYS July 31, 1962 A. W. SERIO 3,047,186
VENT KNOB
Filed Dec. 6, 1957 3 Sheets-Sheet 2
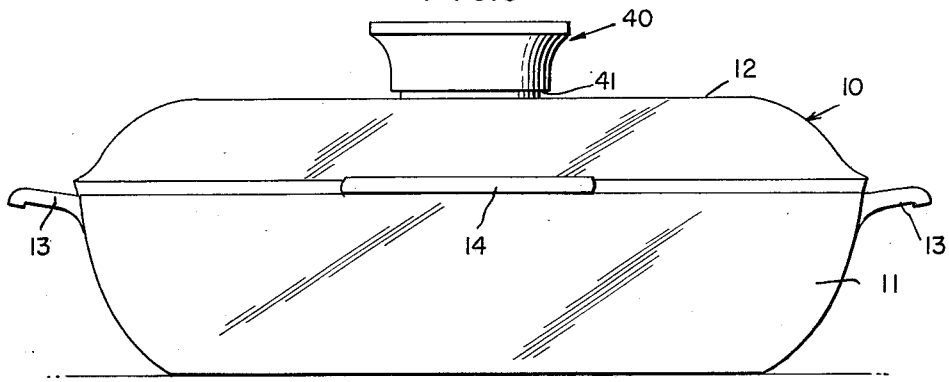
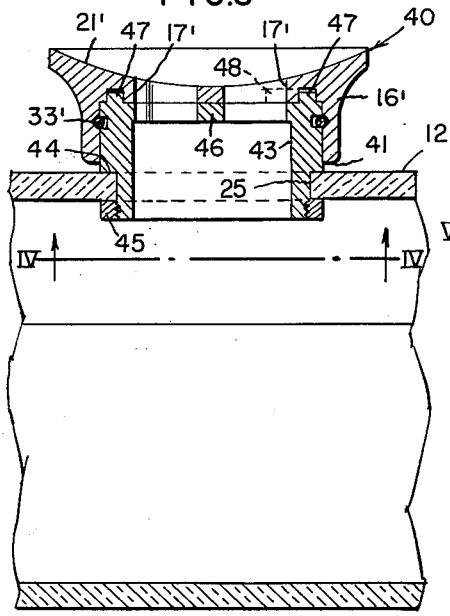
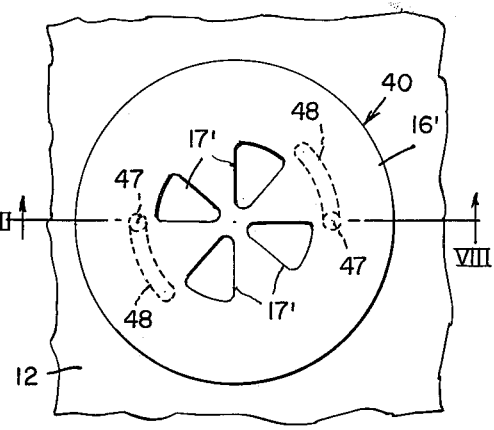
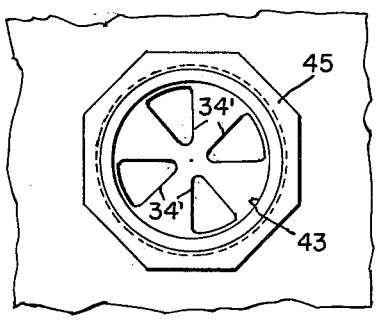
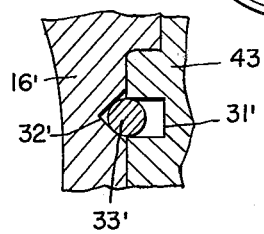
INVENTOR.
Anthony W. Serio
BY
Shoemaker & Mattare
ATTYS July 31, 1962 A. W. SERIO 3,047,186
VENT KNOB
Filed Dec. 6, 1957 3 Sheets-Sheet 3
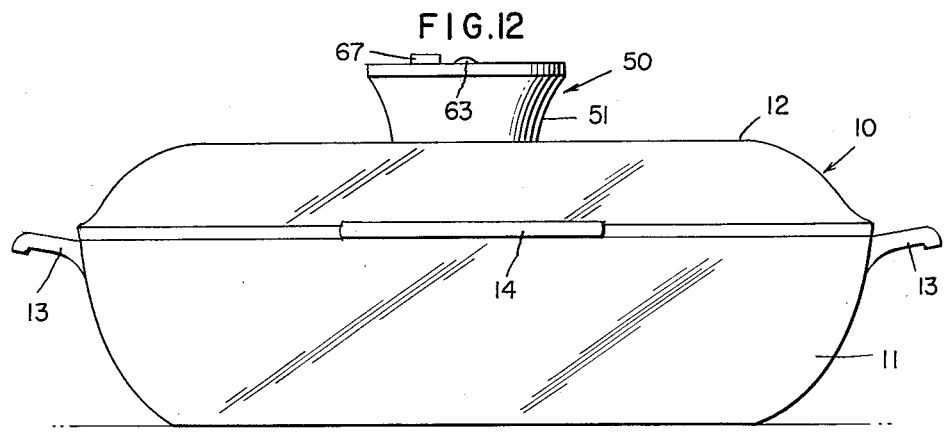
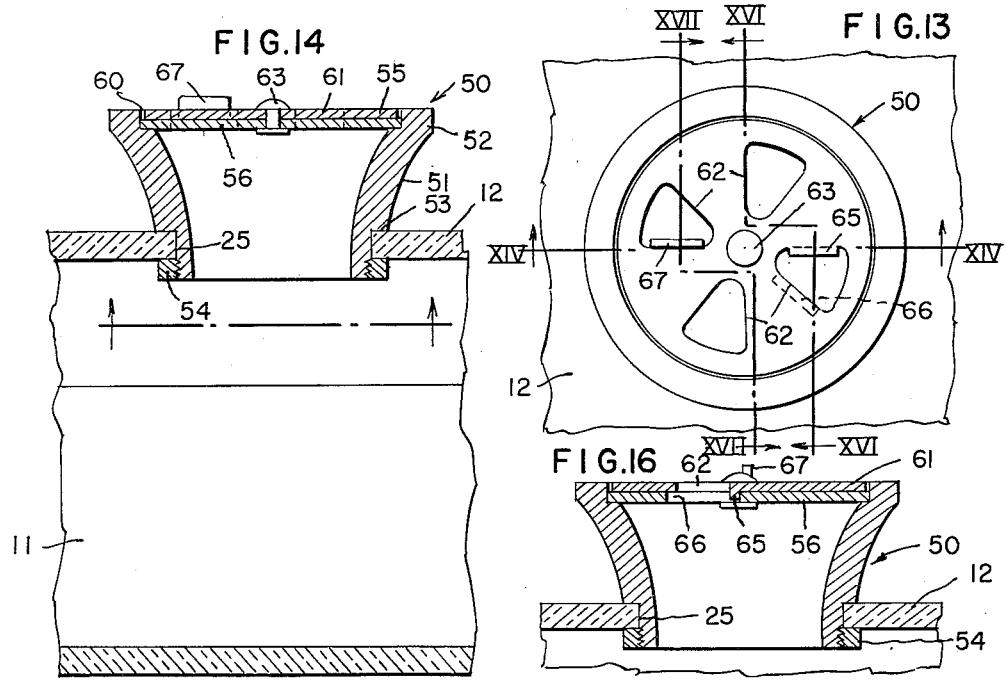
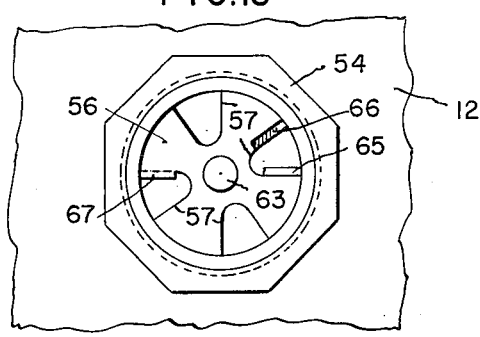
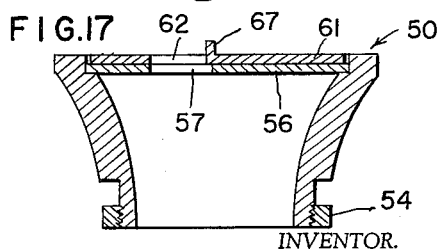
INVENTOR.
Anthony W. Serio
BY
Shoemaker & Mattare
ATTYS

United States Patent Office

3,047,186
Patented July 31, 1962

3,047,186
VENT KNOB
Anthony W. Serio, 1704 Caton Ave., Elmira, N.Y.
Filed Dec. 6, 1957, Ser. No. 701,169
7 Claims. (Cl. 220—44)

The present invention relates to a new and novel vent knob, and more particularly to a vent knob employed in conjunction with the covers of cooking utensils and the like.

The present invention is especially adapted for use with the covers of baking appliances, pans, skillets or similar cooking utensils wherein it is desirable to control the amount of hot air or steam within the utensil which it is desired to vent to atmosphere at various stages of the cooking process.

It is desirable to provide a suitable vent means which can also be employed as a knob for lifting the cover, thereby eliminating the necessity of providing an additional handle for this purpose.

Various devices have been designed for providing a combined vent and knob means, but such known devices have proven to be unsatisfactory because of excessive complexity and expense, and further because of the difficulty in assembly and disassembly thereby rendering cleaning or replacement of parts extremely difficult.

The present invention provides a new and novel, simple arrangement wherein the cost thereof is reduced to a minimum. A movable member is rotatably journaled on a body means which is adapted to be secured to a cover in such a manner that the vent knob assembly may be quickly and easily secured to and removed from the cover. The body means and the movable member may also be quickly and easily assembly and disassembled for cleaning or replacing damaged parts when necessary.

An object of the present invention is to provide a new and novel vent knob which may be quickly and easily secured to and removed from a cover.

Another object is the provision of a vent knob the components of which may be quickly and easily assembled and disassembled.

A further object of the invention is to provide a new and novel vent knob which is simple and inexpensive in construction, yet sturdy and reliable in operation.

Other objects and many attendant advantages of the invention will become more apparent when considered in connection with the following specification and accompanying drawings wherein:

FIG. 1 is a front view of a cooking utensil incorporating a preferred embodiment of a vent knob according to the present invention, FIG. 2 is a top view of a cut-away portion of FIG. 1 illustrating the top of the vent knob, FIG. 3 is a sectional view taken along line III—III of FIG. 2 looking in the direction of the arrows, FIG. 4 is a bottom view of the device shown in FIG. 3, FIG. 5 is a sectional view taken along line V—V of FIG. 2, FIG. 6 is a view similar to FIG. 1 wherein a modified vent knob is employed, FIG. 7 is a top view of a cut-away portion of FIG. 6 illustrating the top of the vent knob, FIG. 8 is a sectional view taken along line VIII—VIII of FIG. 7 looking in the direction of the arrows, FIG. 9 is a bottom view of the device shown in FIG. 8, FIG. 10 is an enlarged view of a portion of the device shown in FIG. 8, FIG. 11 illustrates an annular split ring employed in the device, FIG. 12 is a view similar to FIG. 1 wherein another modified vent knob is employed, FIG. 13 is a top view of a cut-away portion of FIG. 12 illustrating the top of the vent knob, FIG. 14 is a sectional view taken along line XIV—XIV of FIG. 13 looking in the direction of the arrows, FIG. 15 is a bottom view of the device shown in FIG. 14, FIG. 16 is a sectional view taken along line XVI—XVI of FIG. 13 looking in the direction of the arrows, and FIG. 17 is a sectional view taken along line XVII—XVII of FIG. 13 looking in the direction of the arrows.

Referring now to the drawings wherein like reference characters designate corresponding parts throughout the several views, there is shown in FIG. 1 a cooking utensil in the form of a baking or casserole dish indicated generally by reference numeral 10 and including a bottom portion 11 and cover portion 12 adapted to fit snugly upon the lower portion thereof. Utensil 10 may be formed of any suitable material, such as heat resistant glass or the like, the lower portion 11 thereof being provided with two diametrically opposite, outwardly extending projections 13 to which a removable handle of the type shown, for example, in United States Patent No. 2,478,784 may be attached. Cover 12 is provided with two diametrically opposite, outwardly extending projections 14 similar to projections 13, only one of projections 14 being visible in FIG. 1.

A vent knob according to the present invention as indicated generally by reference numeral 15 includes a movable body means 16 having four substantially sector-shaped, equally spaced openings 17 formed therethrough as seen most clearly in FIG. 2. Member 16 may be formed of any suitable material, preferably heat insulating, such as plastic or the like. Referring to FIG. 3, member 16 is provided with a concave upper surface 20 and with an outer surface 21 which tapers inwardly in a downward direction thereby providing a surface which may be easily grasped in the hand for lifting the cover when desired. Member 16 is also provided with a substantially cup-shaped cavity 22 in the lower surface thereof.

A hollow, substantially cylindrical body means 23 fits within the cup-shaped cavity in member 16 and extends through an opening 25 provided through the center of cover 12. Body means 23 is provided with an annular, radially extending flange 26 at the lower end thereof, the flange being provided with two diametrically opposite indentations 27, within which are received two downwardly extending lugs 28, formed integral with the lower surface of cover 12. In this manner the body means 23 is constrained from rotation with respect to the cover during operation of the device. An annular ring 29, formed of a suitable resilient material such as a heat resistant soft rubber or the like, is disposed on the upper surface of flange 26 in order to insure that the body means will be clamped in proper operative position regardless of slight variations in thickness of the covers with which the device may be utilized. Body means 23 may be of formed sheet aluminum, for example, although any suitable material may be employed.

The upper surface 30 of body means 23 is substantially flat and four openings 34 substantially identical with those formed through member 16 and provided through the upper wall of body means 23. An annular groove 31 is formed in the outer surface of body means 23 and an annular groove 32 of substantially V-shaped, cross sectional configuration is formed in the surface of member 16. A resilient split ring 33 is disposed in the adjacent grooves as seen most clearly in FIGS. 3 and 5. When in assembled position, ring 33 maintains movable means 16 and body means 23 in the relative vertical relationship shown in the drawing, but enables these members to rotate with respect to one another.

When, however, it is desired to disassemble the member 16 from member 23, the V-shaped configuration of groove 32 provides a camming action upon ring 33 such that upon relative vertical movement of these members, ring 33 is forced down into groove 31 permitting movable means 16 to be removed from body means 23. When assembling these two components, ring 33 is again forced down into groove 31 until groove 32 is adjacent to groove 31 whereupon ring 33 will expand into the position shown in the drawings.

Movable means 16 is journaled upon the upper flat surface 22 of body means 23 and also engages the upper surface of cover 12 whereby the assembled vent knob securely clamps the edges adjacent opening 25 in the cover between the lower surface of movable means 16' and the upper surface of resilient annular member 29. As seen most clearly in FIG. 5, movable means 16 is provided adjacent one of the openings 17 therethrough with a downwardly extending lug 35 which serves as a stop means for limiting relative movement of member 16 with respect to body means 23. A seen in FIG. 5, movable means 16 is at one limit of movement wherein lug 35 engages the lateral surface 36 of one of the openings 34 through means 33. At the opposite limit of angular movement of movable means 16, lug 35 fits within and engages the lateral surface of recess 37 formed in body means 23 adjacent one of the openings 34 thereof. At one limit of angular movement of member 16, as seen in the drawings, openings or apertures 17 through movable means 16 and openings or apertures 34 through body member 23 are in alignment with one another whereby the apertures through the body means 23 are in communication with atmosphere, and at the opposite limit of angular movement of body means 16, apertures 17 and 34 are out of alignment such that apertures 34 through body means 23 are completely covered. It is evident that movable means 16 may be rotated to any intermediate position in accordance with the desired cooking procedure.

Referring now to FIGS. 6–11, a modified vent knob according to the present invention is indicated generally by reference numeral 40 and has an outer configuration similar to that of vent knob 15 shown in FIG. 1 except that the lower surface 41 thereof is spaced from the upper surface of cover 12. Movable means 16' of vent knob 40, formed of a suitable heat insulating material such as plastic or the like, is provided with four openings 17' similar to openings 17 of the device shown in FIG. 1. Hollow body means 43, which may be formed of plastic or other suitable material, is provided with an external annular shoulder 44 which rests upon the edge of cover 12 adjacent openings 25 therethrough. The outer surface of the lower end of body means 43 is provided with screw threads and a nut 45 is threaded thereon thereby clamping the edge of cover 12 adjacent opening 25 therethrough between shoulder 44 of the body means and the upper surface of the nut, thereby removably fixing member 43 to the cover.

Body means 43 is provided with four openings 34' similar to the openings 34 of the device shown in FIG. 1. As seen most clearly in FIG. 10, the outer surface of body means 43 is provided with an annular groove 31' and the inner surface of movable means 16 is provided with an annular groove 32', each of grooves 31' and 32' being similar to grooves 31 and 32 of the device shown in FIG. 1. A resilient split ring 33' is disposed in grooves 31' and 32', and operates in the same manner as ring 33 of the embodiment shown in FIG. 1. FIG. 11 shows a top view of resilient split ring 33'.

Movable means 16' is journaled for rotation on the upper flat surface 46 of body means 43. As shown in FIGS. 7 and 8, two diametrically opposite, upwardly extending lugs 47 are provided on the upper surface 46 of member 43, each of these lugs being disposed within an associated slot 48 formed in the lower surface of movable means 16'. Lugs 47 travelling in slots 48 serve as a limit stop means for limiting the relative rotation between movable means 16' and body means 43. Movable means 16' may be rotated during operation from a position wherein openings 34' are vented to atmosphere to a position completely closing apertures 34', and any intermediate position as may be desired.

Referring to FIGS. 12–17, another modified vent knob according to the present invention is indicated generally by reference numeral 50. The outer surface 51 of hollow body means 52, formed of plastic or drawn aluminum, for example, is tapered in a manner similar to that of movable member 16 of the device shown in FIG. 1 whereby it may be easily grasped for lifting the cover. Body means 52 is provided with an annular shoulder 53 on the outer surface thereof which rests upon the upper surface of cover 12 about the edge of opening 25 formed therethrough. The outer surface of the lower end of body means 52 is threaded and a nut 54 is threaded thereon for clamping the edge of the cover adjacent opening 25 between shoulder 53 and the upper surface of nut 54.

An annular shoulder 55 is provided on the inner surface of body means 52. A flat plate 56, having four equally spaced openings or apertures 57 formed therethrough, is pressed in place and has a tight fit with an inner lateral wall 60 of body means 52. This pressed fit must be sufficiently tight to prevent plate 56 from being displaced by pressure within the cooking utensil during operation. It is preferable, however, that means be provided for removing plate 56 from body means 52 for cleaning or replacing the parts. For this purpose the fit may be such that it can be manually removed, or as an alternative, plate 56 may be threaded or otherwise suitably removably secured within the body means.

A second flat plate 61 is rotatably journaled on the upper surface of plate 56, the diameter of circular plate 61 being slightly less than that of plate 56. Plate 61 is provided with four equally spaced openings or apertures 62 formed therethrough and is secured to plate 56 by means of a rivet 63 extending through central openings formed through plates 61 and 56. As seen most clearly in FIG. 16, plate 61 is provided with a downwardly extending lug 65 serving as a stop means. Lug 65 is adapted to be received within a complementary recess 66 formed in lower plate 56 adjacent one of the openings 57 thereof. Plate 61 is also provided with an upwardly extending lug 67 which may be manually grasped for rotating plate 61 with respect to plate 56 for closing or uncovering apertures 57 through plate 56.

It should be noted that although four apertures have been shown in the body means and movable means of each of the modifications, only one aperture or any other number may be provided as desired. The configuration of the apertures may also be varied, although the section-shaped configuration as shown in the drawings is considered preferable. The outer body means of the knob, which is grasped by the hand, may be of a color complementary to that of a removable handle employed with the cooking utensil thereby providing a more commercially attractive product.

It is apparent from the foregoing that there is provided a new and novel vent knob which may be quickly and easily secured to a cover, and wherein the components thereof may also be quickly assembled and disassembled for cleaning or replacing such components. The device is simple and inexpensive in construction, yet is sturdy and reliable in operation. The device further serves a dual purpose of providing a means for venting the interior of a utensil to atmosphere and also providing a means for lifting the cover.

As this invention may be embodied in several forms without departing from the spirit or essential characteristics thereof, the present embodiment is therefore illustrative and not restrictive, since the scope of the invention is defined by the appended claims and all changes that fall within the metes and bounds of the claims or that form their functional as well as conjointly cooperative equivalents, are therefore intended to be embraced by those claims.

What is claimed is:

1. A vent knob for a cover member having an opening formed therethrough which comprises a substantially cylindrical hollow body means extending through the opening in the cover and having an annular radially extending flange formed adjacent the lower end thereof, said flange having at least one indentation formed therein adapted to engage a complementary projection on the lower surface of the cover, said flange having resilient means on the upper surface thereof for engaging the lower surface of the cover, said body means having at least one aperture formed therethrough in communication with the hollow interior of said body means, means for removably fixing said body means to the cover member, hollow movable means rotatably mounted on and substantially surrounding said cylindrical body means, said movable means having at least one aperture formed therethrough whereby said movable means may be angularly moved from a position closing the aperture through said body means to a position uncovering the aperture through said body means, said body means and said movable means each having stop means thereon, the stop means on said body means being disposed so as to engage the stop means on said movable means for limiting relative rotation in both directions of said body means and said movable means.

2. A device as defined in claim 1 wherein the stop means on said movable means comprises a downwardly extending lug, and the stop means on said body means includes a recess for receiving said lug.

3. A device as defined in claim 1 wherein said body means has an annular groove formed in the outer surface thereof, said movable means having an annular groove substantially V-shaped cross sectional configuration formed in the inner surface thereof adjacent the groove formed in said body means, and an annular split ring disposed in said grooves for releasably maintaining said body means and said movable means in operative relationship to one another.

4. A vent knob for a cover member having an opening formed therethrough which comprises a substantially cylindrical hollow body means extending through the opening in the cover member and having an annular radially extending flange at the lower end thereof, said body means including a laterally extending top wall at the upper end thereof, resilient means on the upper surface of said flange, said resilient means being in engagement with the under surface of the cover member adjacent the opening therein, said body means having at least one aperture formed through the top wall thereof and being in communication with the hollow interior of said body means, hollow movable means having a substantially cylindrical cavity formed in the lower surface thereof, said movable means being rotatably mounted on and substantially surrounding said cylindrical body means, said movable means having at least one aperture formed therethrough and disposed adjacent said top wall of the body means, whereby said movable means may be angularly moved from a position closing the aperture through said body means to a position uncovering the aperture through said body means, said body means and said movable means each having stop means thereon, the stop means on said body means being disposed so as to engage the stop means on said movable means for limiting relative rotation in both directions of said body means and said movable means, said body means having an annular groove formed in the outer surface thereof, said movable means having an annular groove formed in the inner surface thereof adjacent the groove formed in said body means, an annular split ring disposed in said grooves for releasably maintaining said body means and said movable means in operative relationship to one another, the lower surface of said movable means forming an annular shoulder in engagement with the upper surface of said cover member whereby said cover member is clamped between the resilient means on the upper surface of said annular flange at the lower end of said body means and the lower surface of the movable means for removably fixing the vent knob to said cover member.

5. A vent knob for a cover member having an opening formed therethrough which comprises a hollow body means extending through the opening in the cover member and having flange means at the lower end thereof engaging the under surface of said cover member, said body means including a laterally extending top wall at the upper end thereof, said body means having at least one aperture formed through the top wall thereof and being in communication with the hollow interior of said body means, hollow movable means having a cavity formed in the lower surface thereof, said movable means being rotatably mounted on and substantially surrounding said hollow body means, said movable means having at least one aperture formed therethrough and disposed adjacent said top wall of the body means whereby said movable means may be angularly moved from a position closing the aperture through said body means to a position uncovering the aperture through said body means, said body means and said movable means having cooperating stop means for limiting relative rotation in both directions of said body means and said movable means, said body means having an annular groove formed in the outer surface thereof, said movable means having an annular groove formed in the inner surface thereof adjacent the groove formed in said body means, an annular split ring disposed in said grooves for releasably maintaining said body means and said movable means in operative relationship to one another with the lower surface of said movable means being in engagement with the upper surface of said cover member whereby said cover member is clamped between said flange means and the lower surface of the movable means for removably fixing the vent knob to said cover member.

6. A vent knob for a cover member having an opening formed therethrough which comprises a substantially cylindrical hollow body means extending through the opening in the cover member and having radially extending flange means at the lower end thereof engaging the under surface of said cover member, said body means including a laterally extending top wall at the upper end thereof, said body means having at least one aperture formed through the top wall thereof and being in communication with the hollow interior of said body means, hollow movable means having a substantially cylindrical cavity formed in the lower surface thereof, said movable means being rotatably mounted on and substantially surrounding said cylindrical body means, said movable means having at least one aperture formed therethrough and disposed adjacent said top wall of the body means whereby said movable means may be angularly moved from a position closing the aperture through said body means to a position uncovering the aperture through said body means, said body means and said movable means having cooperating stop means thereon limiting relative rotation in both directions of said body means and said movable means, said body means having an annular groove formed in the outer surface thereof, said movable means having an annular groove formed in the inner surface thereof adjacent the groove formed in said body means, an annular split ring disposed in said grooves for releasably maintaining said body means and said movable means in operative relationship to one another, the lower surface of said movable means forming an annular shoulder in engagement with the upper surface of said cover member whereby said cover member is clamped between said annular flange means at the lower end of said body means and the lower surface of the movable means for removably fixing the vent knob to said cover member.

7. A vent knob for a cover member having an opening formed therethrough which comprises a substantially cylindrical hollow body means extending through the opening in the cover, said body means having at least one aperture formed therethrough in communication with the hollow interior of said body means, means for removably fixing said body means to the cover member, hollow movable means rotatably mounted on and substantially surrounding said cylindrical body means, said movable means having at least one aperture formed therethrough whereby said movable means may be angularly moved from a position closing the aperture through said body means to a position uncovering the aperture through said body means, said body and said movable means each having stop means thereon, the stop means on said body means being disposed so as to engage the stop means on said movable means for limiting relative rotation in both directions of said body means and said movable means, said body means having an annular groove formed in the outer surface thereof, said movable means having an annular groove of substantially V-shaped cross-sectional configuration formed in the inner surface thereof adjacent the groove formed in said body means in operative relationship to one another.

References Cited in the file of this patent

UNITED STATES PATENTS

| | | |
|---|---|---|
| 646,276 | Follweiler | Mar. 27, 1900 |
| 932,774 | Foster | Aug. 31, 1909 |
| 1,345,975 | Wilcox | July 6, 1920 |
| 1,422,935 | Dean | July 18, 1922 |
| 1,958,429 | Hartog | May 15, 1934 |
| 2,376,855 | Hanley | May 29, 1945 |
| 2,889,089 | Herrick et al. | June 2, 1959 |

FOREIGN PATENTS

| | | |
|---|---|---|
| 252,472 | Switzerland | Dec. 31, 1942 |